US006290633B1

(12) United States Patent
Sondergeld

(10) Patent No.: US 6,290,633 B1
(45) Date of Patent: Sep. 18, 2001

(54) DAMPING ROLLER FOR PRINTING PRESSES AND METHOD FOR THE PRODUCTION THEREOF

(75) Inventor: Werner Sondergeld, Gross-Glienicke (DE)

(73) Assignee: The Morgan Crucible Company PLC, Windsor (GB)

( * ) Notice: Subject to any disclaimer, the term of this patent is extended or adjusted under 35 U.S.C. 154(b) by 0 days.

(21) Appl. No.: 09/445,911

(22) PCT Filed: Jun. 8, 1998

(86) PCT No.: PCT/DE98/01594

§ 371 Date: Mar. 22, 2000

§ 102(e) Date: Mar. 22, 2000

(87) PCT Pub. No.: WO98/58807

PCT Pub. Date: Dec. 30, 1998

(30) Foreign Application Priority Data

Jun. 23, 1997 (DE) .............................................. 197 27 829

(51) Int. Cl.[7] ...................................................... F16C 13/00
(52) U.S. Cl. .............................................. 492/58; 427/250
(58) Field of Search .................................. 492/58, 18, 28; 101/348; 427/250, 248.1, 255; 428/906

(56) References Cited

U.S. PATENT DOCUMENTS 4,887,528 * 12/1989 Ruge et al. .......................... 101/148
4,991,501 * 2/1991 Yokoyama et al. .................. 101/148
5,113,760 * 5/1992 Sonobe et al. ........................ 101/348
5,647,279 * 7/1997 Johner et al. ...................... 101/401.1
6,014,929 * 1/2000 Teng ..................................... 101/456

FOREIGN PATENT DOCUMENTS 3139646 7/1982 (DE) .
4321183 1/1994 (DE) .
4229700 5/1994 (DE) .
19514538 10/1996 (DE) .
2270279 3/1994 (GB) .

OTHER PUBLICATIONS

Abstract of Japanese Patent Document No. 55077599 (Jun. 11, 1980).

Abstract of Japanese Patent Document No. 04238034 (Aug. 26, 1992).

* cited by examiner

*Primary Examiner*—S. Thomas Hughes
*Assistant Examiner*—Marc Butler
(74) *Attorney, Agent, or Firm*—Dean W. Russell; Kilpatrick Stockton LLP

(57) ABSTRACT

A damping roller for printing presses and a method for the production thereof, wherein a heat injected microporous special steel coating is applied to a cylindrical base body, is described. The average pore body of said coating is approximately 5 μm. A thicker moistening agent film is obtained by capillary force thereby enabling a higher moistening agent flow rate in the damping system of an off-set printing press.

10 Claims, 2 Drawing Sheets

DAMPING ROLLER FOR PRINTING PRESSES AND METHOD FOR THE PRODUCTION THEREOF

FIELD OF THE INVENTION

The invention relates to a dampening roller for printing presses and also a method for the production of a dampening roller.

BACKGROUND OF THE INVENTION

A dampening unit is provided with a metering roller in printing presses used in printing technology, for example in offset printing, and has the object of transferring a moistening agent film as thinly and uniformly as possible onto the printing block of a printing block cylinder, the print outcome being dependent upon the quality of the supply of moistening agent. In the film dampening units of offset presses, a supplement of isopropyl alcohol of between 8% and 15% is used as a rule in order to ensure perfect dampening. However, since isopropyl alcohol is one of the highly volatile organic solvents which have a disadvantageous effect on the environment efforts are being made world-wide to reduce its emission significantly.

SUMMARY OF THE INVENTION

For years therefore, work has been carried out to find possible ways of using as little an alcohol supplement as possible in the moistening agent in the offset process. The main problem with reduced-alcohol printing is the toning of the printing plate due to the lack of moisture and also irregular moistening. Isopropyl alcohol has wetting-promoting and viscosity-increasing properties which, from an added quantity of approx. 6%, ensure an adequately thick, uniform moistening agent film on dampening rollers and printing plates. When printing with a smaller alcohol supplement, the build-up of an optimal moistening agent film must be supported by specially adapted dampening rollers.

Electro-chrome-plated rollers, which are polished to a roughness of $R_z<1.5$ μm, are known. In these chrome-plated rollers, the moistening is adequate for normal printing jobs when sufficient alcohol is added but, with a smaller proportion of alcohol, problems can arise with the provision of moistening agent being too little and too irregular.

A dampening unit roller for a printing press is known from DE 43 21 183 in which the roller cylinder is provided with a coating made of zirconium oxide/yttrium oxide which is applied by means of thermal spraying and has a thickness of 0.2 to 2 mm and a surface roughness of $R_z<5$ μm. In the case of this known dampening unit roller, the moistening agent discharge and the uniformity of the moisture film are still adequate even with a small alcohol supplement. The coating costs are however far higher than with an electro-chrome-plated roller. The required pore fineness can be met only by the highest requirements in plasma spraying technology and the use of fine spray powders leads to long spraying times. The polishing and finishing of the ceramic material is likewise demanding and costly. In addition, the roller must be sealed to reduce the porosity, the sealing agent being washed off again in the course of time as a result of which a deterioration in the printing properties can occur.

Furthermore, a coating made of metallic silicon, which is applied by plasma spraying, is known (DE 42 29 700), which coating is polished to the desired roughness of $R_z<1.5$ μm. Such a coating has a lower porosity than ceramic material and sealing with a sealing agent is not required. This roller has good wettability but the costs are high for the plasma spraying due to high powder costs and long spraying times. It is of disadvantage that the hardness is less than in the case of ceramic material.

Proceeding from the described state of the art, the object underlying the invention is to produce a dampening roller and a method for the production thereof which has a uniform moistening agent provision even with a reduced proportion of isopropyl alcohol in the moistening agent and also a high level of durability, the costs for the production thereof requiring to be kept low.

This object is achieved according to the invention by the characterising features of the main claim and those of the independent method claim.

As a result of the fact that the coating of the dampening roller is a thermally sprayed microporous alloy steel coating, a higher moistening agent flow rate is achieved which is ensured by means of the micropores via capillary force and a wick effect. The micropores have preferably a diameter between 2 μm and 20 μm, the centre of the pore size distribution being at 5 μm. On the one hand, the pores are large enough to ensure the formation of a sufficiently thick moistening agent film by capillary force and a wick effect but, on the other hand, are still small enough that no dirt contamination of the dampening unit occurs as a result of entrainment or emulsification of the printing ink. This compromise is fulfilled ideally with the dampening roller according to the invention.

The dirt contamination of the dampening unit has been the main problem until now in the development of dampening rollers with improved wettability. Dampening rollers with a metal- or ceramic coating come into contact with a rubber-coated moisture spreading roller in their capacity as distribution- or collection rollers. The moisture spreading roller takes up printing ink however during printing. This taking-up of colour on the rubber-coated moisture spreading roller is conditioned by contact with the printing plate and does not impair the printing process. However, if printing ink is transferred by a too porous or too rough distribution- or collection roller onto other dampening rollers or gets into the moistening agent in the form of emulsified ink particles, the result is non-uniform moistening and hence printing defects.

One of the main demands made of a dampening roller, which has improved wettability due to its surface properties, is thus the restriction of the surface roughness or the surface porosity. Microporous alloy steel has clear advantages in this respect over ceramic materials since the alloy steel particles provide better conditions for the formation of a fine-grained and homogeneous structure due to the low melting point of said alloy steel particles and their easy formability. Hence, when using microporous alloy steel rollers, the dampening unit remains free of printing ink even in difficult conditions, as a result of which even long editions can be printed with constantly reliable moistening.

In contrast to roughened chrome rollers, the increased conveying capacity of which soon decreases due to surface smoothing, the effectiveness of microporous alloy steel is independent of wear since the micropores are not located only on the surface.

Altogether, the microporous alloy steel roller leads to an especially uniform and reliable moistening via good wetting of the surface of said alloy steel roller and hence creates good conditions for printing with a reduced quantity of isopropyl alcohol.

By means of the measures indicated in the sub-claims, advantageous developments and improvements are possible.

Due to the anodic etching of the surface in the tampon method, the collection volume of the dampening roller is increased and ensures thus adequate delivery of the moistening agent during reduced-alcohol printing.

The uniformity of the supply of moistening agent and the collection capacity is better by far than with chrome rollers and comparable with those of good ceramic rollers, the costs of producing the dampening roller according to the invention being markedly less than with rollers which have a silicon coating. The fineness of the micropores can be maintained with the alloy steel used in the case of the invention relatively simply and reliably in a favourable range, the coating according to the invention being able to be sprayed with considerably fewer technical demands in comparison to ceramic layers with the same porosity. Furthermore, the coating according to the invention requires no sealing of the surface. The alloy steel surface has definite advantages in the cleaning of the rollers; in contrast to ceramic material, printing ink can be removed from the alloy steel coating almost in its entirety.

The microporous alloy steel coating of the roller according to the invention is substantially less sensitive than ceramic material with respect to edge damage due to impact stress. As a result, the installation and handling of the rollers is facilitated.

Reliable protection against corrosion is ensured with a layer thickness of the alloy steel coating of approx. 400 μm so that an additional protective layer against corrosion, which is demanded with ceramic rollers in dampening units, is not required.

BRIEF DESCRIPTION OF THE DRAWINGS

An embodiment of the invention, given by way of example, is represented in the drawings and is explained in more detail in the subsequent description, which shows:

DETAILED DESCRIPTION

Figure 1:
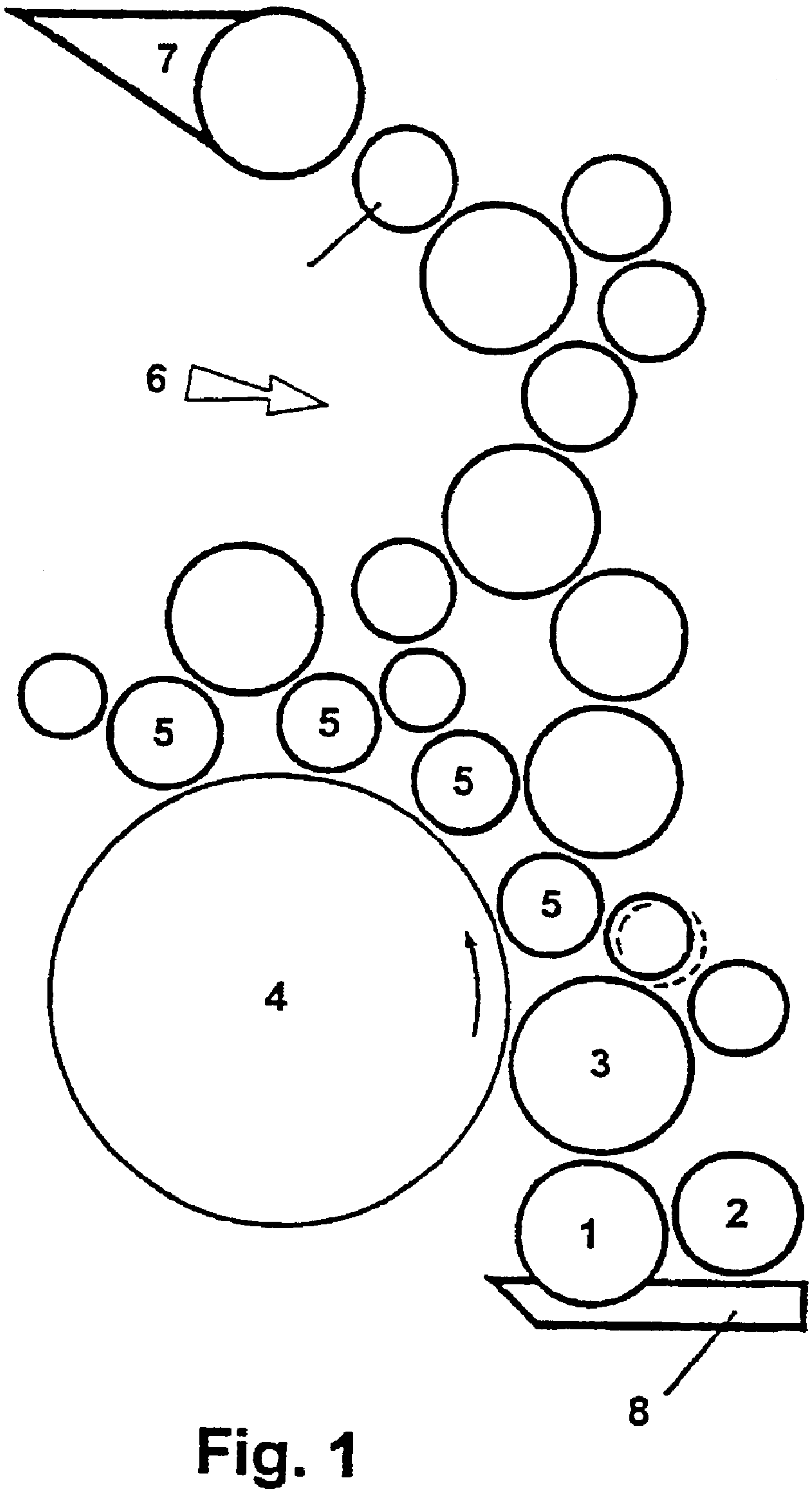

FIG. 1 a dampening unit and inking unit of an offset press, and

Figure 2:
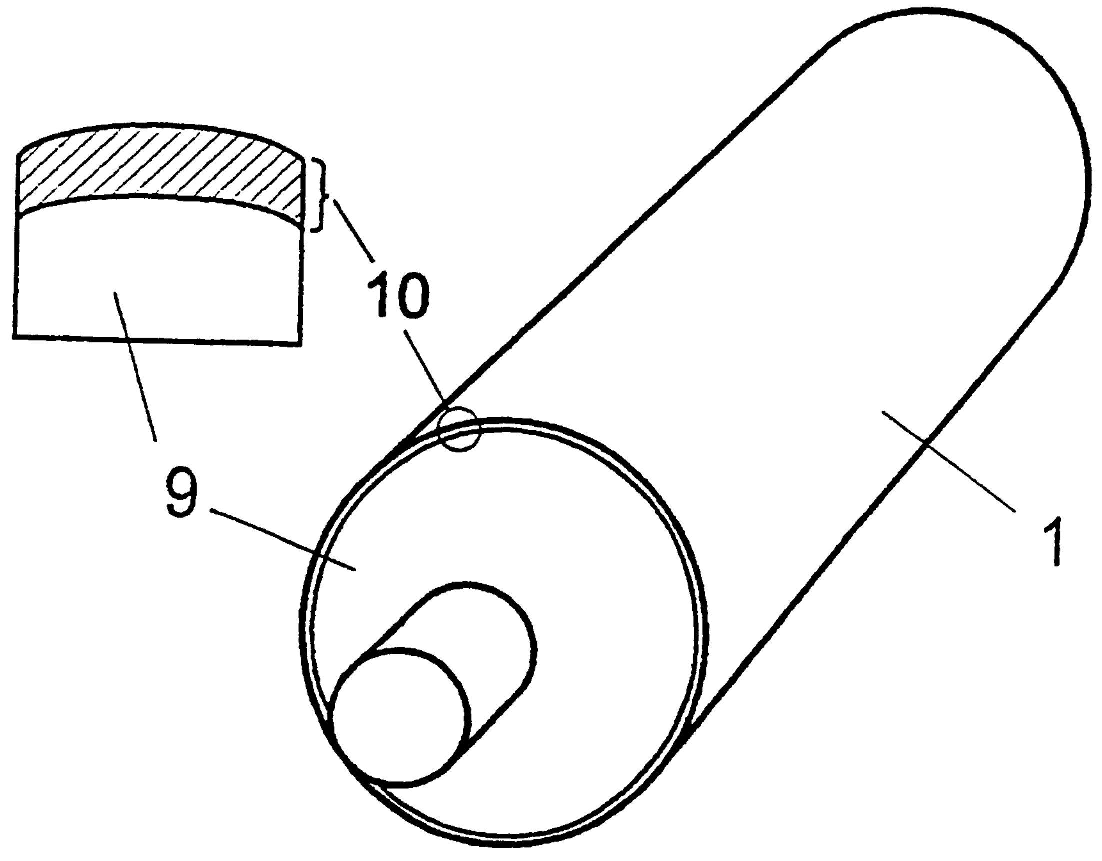

FIG. 2 a dampening roller according to the invention in partial section.

In FIG. 1, the arrangement of the rollers of a printing unit of an offset printing press is represented, the rollers 1 to 3 representing the dampening unit as dampening rollers and inking rollers 5 being a component of the inking unit 6 which is assigned to an inking duct 7 and via which the printing ink is transferred from the ink duct 7 to a plate cylinder 4. The roller, designated by 1, of the dampening unit is a collection roller which is assigned to a dampening water storage tank 8 and which conveys water out of the storage tank 8. A metering roller 2 strips excess moistening agent from the collection roller. Said metering roller meters out the moistening agent film to an optimal thickness via contact pressure and speed difference (slippage). The collection roller 1 transfers the pre-metered moistening agent film onto the printing plate on the plate cylinder 4.

The collection roller 1 is shown in FIG. 2 and comprises a basic body 9 made of metal, preferably steel which is provided with a hydrophilic coating 10. The coating 10 is composed of a chrome-nickel steel and is thermally sprayed in powder form onto the basic body 9. Preferably, the alloy steel coating 10 is applied by plasma spraying. The layer thickness of the coating 10 is approx. 400 μm.

As has already been explained previously, the cylindrical basic body 9 is coated by plasma spraying with a metal powder which contains chrome, nickel and molybdenum to produce the collection roller 1 which is configured as a dampening roller. After that, the surface of the coating is processed mechanically so that a layer thickness of approx. 400 μm is left. The alloy steel coating is microporous and hence fine-grained compared to the basic body but has adequate porosity (pore diameter 2 to 20 μm) to deliver good wettability. The pore size is dependent both upon the spray powder used and also the spraying method. The optimal pore size of 3 to 20 μm is achieved only when using a fine spray powder with a particle size of between 25 and 5 μm. When using coarser spray powder, there is a lack of smaller pores with diameters between 2 and 10 μm which are crucial for the printing properties and which bond the moistening agent by capillary force to the surface. Pores with diameters above 20 μm on the other hand cause undesirable entrainment and emulsification of the printing ink and lead hence to the described dirt contamination of the dampening unit and the moistening agent.

The plasma spraying method leads in conjunction with the above-mentioned spray powder to a pore size distribution of 3 to 20 μm with the centre at approx. 6 μm, while high velocity flame spraying produces a pore size distribution of 2 to 7 μm with the centre at approx. 4 μm. Furthermore, in both spraying methods an optimisation of the fine pore size is possible due to the choice of spraying parameters and system factors such as for example the type of burner and the powder supply. Both spraying methods are the state of the art. The above-mentioned optimisation of the spraying parameters can be performed by any average expert.

Subsequently, the surface is completed in a finishing process and obtains thereby a roughness $R_z$ of 0.5 to 3.0, preferably of $R_z$=1.0 μm.

Due to the finishing process, the pores of the alloy steel surface become partly blocked. By means of a subsequent etching process, the blocked pores can be opened again.

The embodiment concerns an anodic etching of the surface of the coating, the roller surface being subjected to an electrolyte which is acted upon by the negative terminal of a voltage supply while the roller 1 is connected to the positive terminal.

Due to ionic migration, material is removed from the surface of the alloy steel coating. Pores of the alloy steel coating are thereby exposed or enlarged, as a result of which the collection volume and the wettability are improved.

In the present case, the coating is applied by plasma spraying. Other thermal coating methods are of course conceivable.

As has been explained above, the alloy steel coating has an alloy of chrome, nickel and molybdenum. In specific cases, it can be useful in order to increase the porosity further to add a specific quantity of ceramic powder to the metal powder for the alloy steel coating, the quantity being able to be up to 10% by weight.

What is claimed is:

1. Dampening roller for printing processes having a cylindrical basic body which is provided with a hydrophilic, thermally sprayed microporous alloy steel coating comprising micropores with a diameter of 2 μm to 20 μm, of said alloy steel coating being between 0.5 μm and 3.0 μm.

2. Dampening roller according to claim 1 in which the coating has a layer thickness of between 0.2 mm and 1 mm.

3. Dampening roller according to claim 1 in which the micropores have a diameter distribution centered at approximately 5 μm.

4. Dampening roller according to claim 1 in which the roughness is approximately 1 μm.

5. Method for producing a dampening roller which has a cylindrical basic body provided with a coating, comprising:

a) applying a microporous alloy steel coating by a thermal spraying method, and b) mechanically processing the alloy steel coating to a roughness of 0.5 μm to 3.0 μm.

6. Method according to claim 5 further comprising: etching the surface of the mechanically processed alloy steel coating.

7. Method according to claim 6 in which the etching comprises anodic etching according to the tampon method.

8. Method according to one of the claim 5 in which the coating is applied by thermal spraying of an alloy steel powder with a quantity of chrome of at least 13% by weight and a particle size of the spraying powder of between 45 μm and 5 μm.

9. Method according to claim 8 in which chrome nickel steel 316L is used as the alloy steel powder and has a quantity of chrome of 18% by weight in the particle size distribution of 25 μm to 5 μm.

10. Method according to claim 5 further comprising adding ceramic powder up to 10% by weight to the alloy steel.

* * * * *

UNITED STATES PATENT AND TRADEMARK OFFICE

CERTIFICATE OF CORRECTION

PATENT NO. : 6,290,633 B1

DATED : September 18, 2001

INVENTOR(S) : Werner Sondergeld

It is certified that error appears in the above-identified patent and that said Letters Patent is hereby corrected as shown below:

Column 3,
Line 40, delete the words "DETAILED DESCRIPTION" and insert same immediately preceding line 46

Column 4,
Line 61, immediately preceding the words "of said" insert the words -- the roughness --

Column 6,
Line 1, delete the words "one of the"

Signed and Sealed this

Twenty-eighth Day of October, 2003

JAMES E. ROGAN
*Director of the United States Patent and Trademark Office*